(12) United States Patent
Huebner et al.

(10) Patent No.: US 10,098,198 B2
(45) Date of Patent: Oct. 9, 2018

(54) INTERIOR AMBIENT AND TASK LIGHT BARS

(71) Applicant: Ford Global Technologies, LLC, Dearborn, MI (US)

(72) Inventors: Annette Lynn Huebner, White Lake, MI (US); Artur Sakarian, Birmingham, MI (US); Ali Ammar, Dearborn, MI (US); Kristin Ann Hellman, Walled Lake, MI (US); Ryan Welch, Ottawa Lake, MI (US); Josh Greiner, Detroit, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 14/244,141

(22) Filed: Apr. 3, 2014

(65) Prior Publication Data

US 2015/0283943 A1 Oct. 8, 2015

(51) Int. Cl.
*B60Q 3/82* (2017.01)
*H05B 33/08* (2006.01)
*B60Q 3/80* (2017.01)

(52) U.S. Cl.
CPC .......... *H05B 33/0866* (2013.01); *B60Q 3/80* (2017.02); *B60Q 3/82* (2017.02); *H05B 33/0848* (2013.01); *H05B 33/0863* (2013.01)

(58) Field of Classification Search
CPC .............. G06F 3/044; H01H 2239/006; H03K 17/962; H03K 17/975; H03K 2217/9607; B60Q 3/00; B60Q 3/001; B60Q 3/0289

USPC ......................................................... 200/600
See application file for complete search history.

(56) References Cited

U.S. PATENT DOCUMENTS

| | | | | |
|---|---|---|---|---|
| 5,747,756 A | * | 5/1998 | Boedecker | H01H 13/702 200/310 |
| 6,813,957 B1 | * | 11/2004 | Platz | G01D 5/24 73/780 |
| 6,879,250 B2 | * | 4/2005 | Fayt | B60R 19/445 150/154 |

(Continued)

FOREIGN PATENT DOCUMENTS

EP 1550579 B1 7/2005
KR 20130104394 A * 9/2013

(Continued)

OTHER PUBLICATIONS

STIC Search.*
KR20130104394A Translation, Retrived Aug. 6, 2018.*

*Primary Examiner* — Jong-Suk (James) Lee
*Assistant Examiner* — Christopher E Dunay
(74) *Attorney, Agent, or Firm* — Vichit Chea; Price Heneveld LLP

(57) ABSTRACT

A light bar is provided and includes an elongated carrier having a surface extending along the carrier. Capacitive sensors are spaced along the carrier and positioned below the surface. Light sources are included for illuminating the surface, each associated with at least one capacitive sensor and positioned proximate thereto. A controller is included for detecting capacitive changes in the capacitive sensors, wherein when the controller detects a capacitive change in a capacitive sensor, the controller alters an illumination state of a light source associated therewith.

17 Claims, 6 Drawing Sheets

(56) References Cited

U.S. PATENT DOCUMENTS

| | | | |
|---|---|---|---|
| 7,242,393 B2* | 7/2007 | Caldwell | A47B 57/00 345/173 |
| 8,915,609 B1* | 12/2014 | Shah | F21S 8/035 362/183 |
| 2001/0036082 A1* | 11/2001 | Kanesaka | B60Q 3/0289 362/555 |
| 2004/0119484 A1* | 6/2004 | Basir | B60Q 5/003 324/680 |
| 2005/0036327 A1* | 2/2005 | Patel | B60Q 1/32 362/487 |
| 2006/0044800 A1 | 3/2006 | Reime | |
| 2006/0086888 A1* | 4/2006 | Eash | F21S 4/008 250/206 |
| 2006/0087829 A1* | 4/2006 | Manico | H03K 17/962 362/84 |
| 2008/0219017 A1* | 9/2008 | Cruickshank | B60Q 3/001 362/488 |
| 2008/0291673 A1* | 11/2008 | Chen | F21S 6/003 362/231 |
| 2010/0097346 A1 | 4/2010 | Sleeman | |
| 2010/0315023 A1* | 12/2010 | Pesson | E04F 11/1836 315/313 |
| 2011/0187676 A1* | 8/2011 | Chang | G06F 3/044 345/174 |
| 2011/0222302 A1 | 9/2011 | Hodgson et al. | |
| 2012/0099303 A1* | 4/2012 | Li | H01L 25/0753 362/231 |
| 2012/0257416 A1* | 10/2012 | Demma | G02B 6/0041 362/613 |
| 2013/0229814 A1 | 9/2013 | Pfeil | |
| 2015/0241025 A1* | 8/2015 | Steiner | H01H 13/83 362/23.05 |

FOREIGN PATENT DOCUMENTS

| | | |
|---|---|---|
| WO | 2004017521 A1 | 2/2004 |
| WO | 2008143833 A2 | 11/2008 |

* cited by examiner

INTERIOR AMBIENT AND TASK LIGHT BARS

FIELD OF THE INVENTION

The present invention generally relates to vehicle lighting systems and more particularly, to vehicle lighting systems employing capacitive touch sensor technology.

BACKGROUND OF THE INVENTION

A variety of lighting approaches are implemented in vehicles today. Such approaches can include ambient lighting for setting a mood and task lighting for assisting an occupant in performing an action. Since these differing lighting approaches are often embodied in separate lighting devices and systems, there is a need for a vehicle lighting system and device that reconciles the two approaches in a user-friendly and attractive manner.

SUMMARY OF THE INVENTION

According to one aspect of the present invention, a light bar is provided and includes an elongated carrier having a surface extending along the carrier. Capacitive sensors are spaced along the carrier and positioned below the surface. Light sources are included for illuminating the surface, each associated with at least one capacitive sensor and positioned proximate thereto. A controller is included for detecting capacitive changes in the capacitive sensors, wherein when the controller detects a capacitive change in a capacitive sensor, the controller alters an illumination state of a light source associated therewith.

According to another aspect of the present invention, a light bar is provided and is installed in a vehicle fixture. The light bar includes a carrier having a surface, capacitive sensors spaced along the carrier, and light sources for illuminating the surface, each associated with at least one capacitive sensor. A controller is included for detecting capacitive changes in the capacitive sensors, wherein when the controller detects a capacitive change in a capacitive sensor, the controller alters an illumination state of a light source associated therewith.

According to another aspect of the present invention, a vehicle lighting system is provided and includes a light bar having capacitive sensors and light sources disposed below a surface and spaced along a carrier. A controller is included for detecting capacitive changes in the capacitive sensors and altering an illumination state of at least one light source when a capacitive change is detected. An input device is in communication with the controller for supplying the controller with user input.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
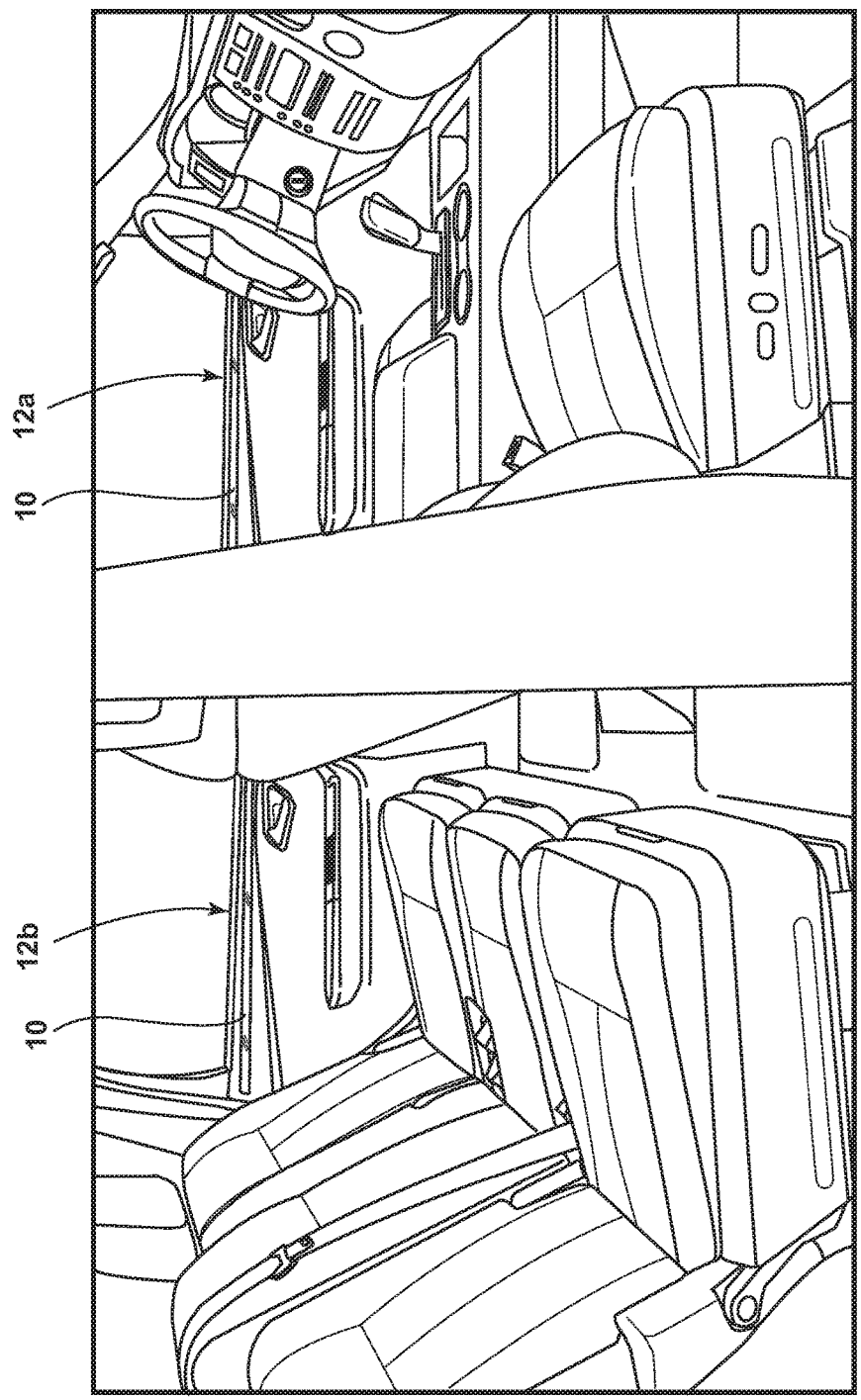
FIG. 1 shows a light bar installed in the interior door panels of the front and rear driver side doors of an automotive vehicle according to one embodiment.
Figure 2:
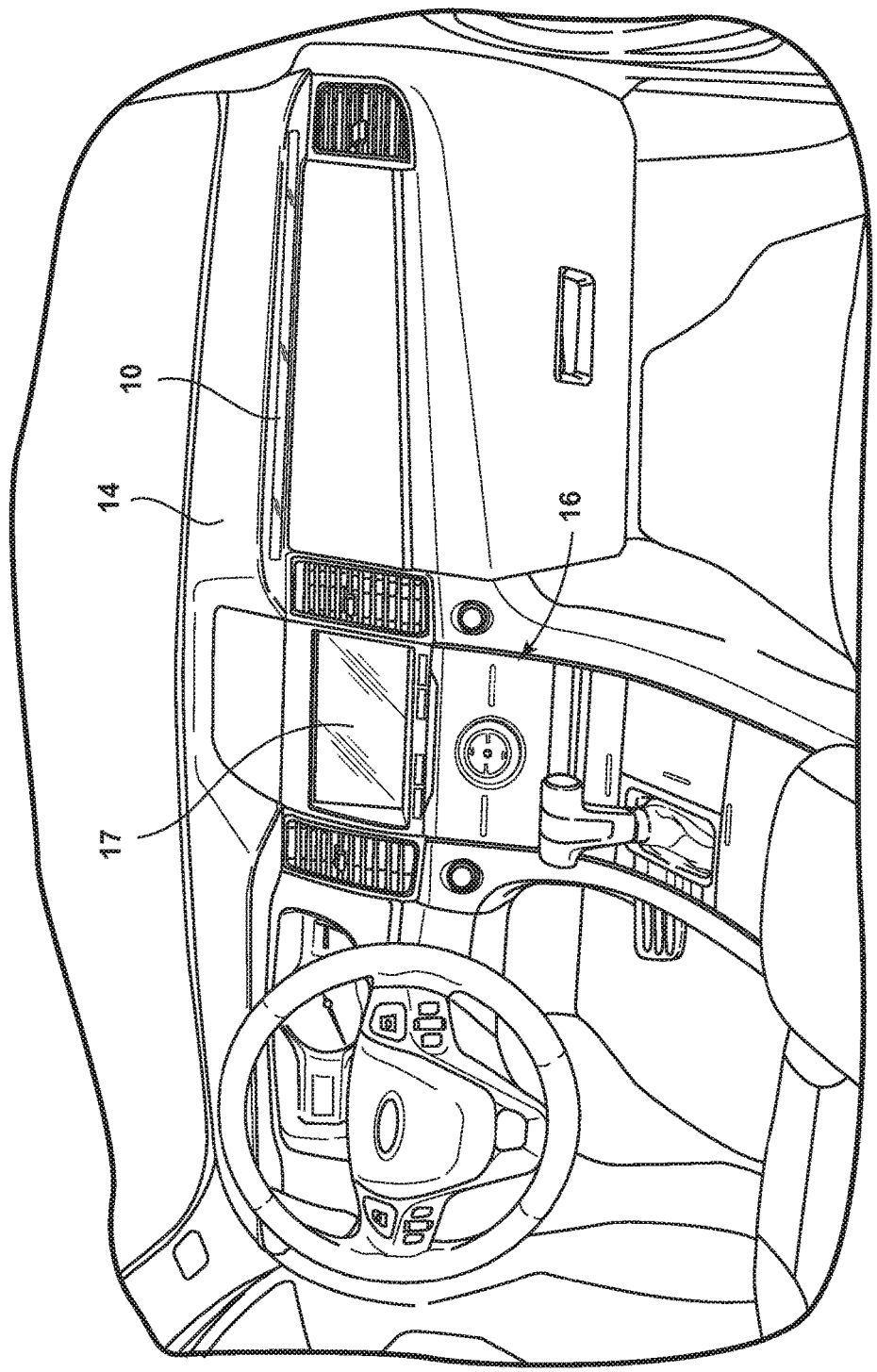
FIG. 2 shows a light bar installed in a vehicle dashboard of an automotive vehicle according to one embodiment.
Figure 3:
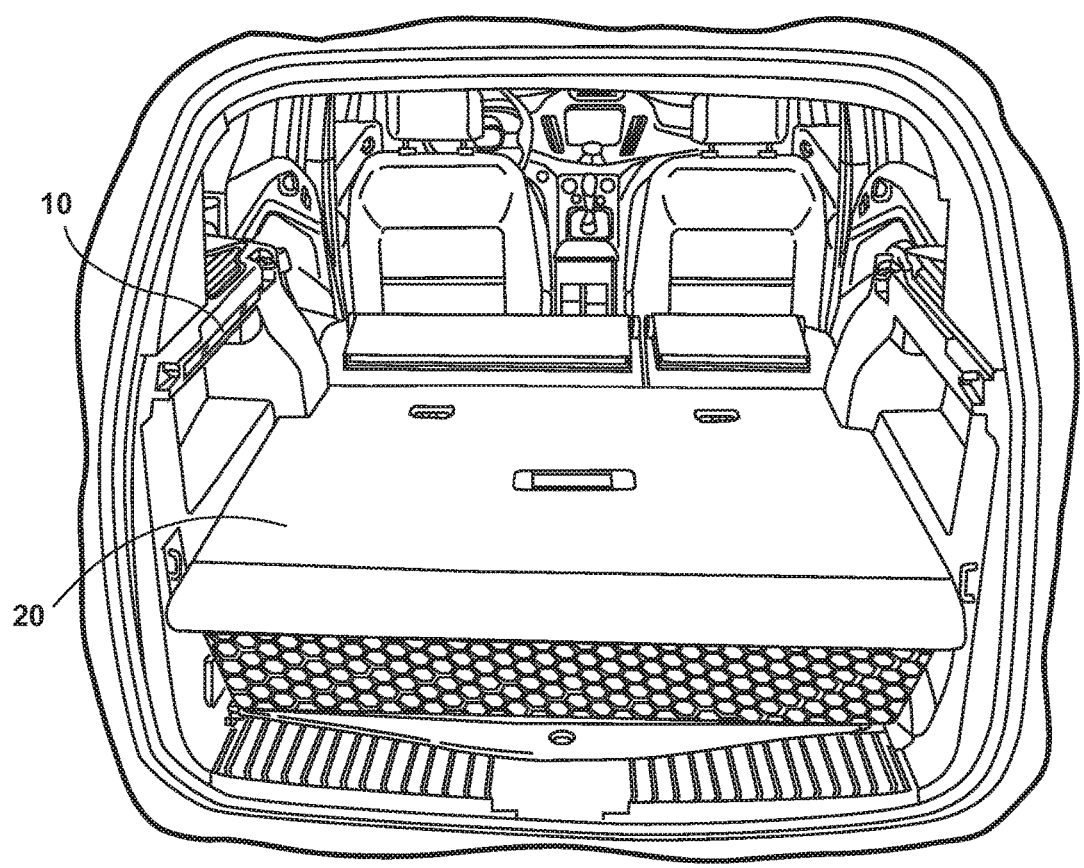
FIG. 3 shows a light bar installed in the driver side of a cargo compartment of an automotive vehicle according to one embodiment.

Referring to FIGS. 1-3, a light bar 10 is exemplarily shown installed in various fixtures inside an automotive vehicle to provide ambient and/or task lighting. In FIG. 1, the light bar 10 is shown installed in the interior door panels of doors 12a and 12b located on the driver side of a vehicle. In FIG. 2, the light bar 10 is shown installed in a vehicle dashboard 14 and extending from an instrument panel 16 with a display monitor 17 towards the passenger side. In FIG. 3, the light bar 10 is shown installed in the driver side of a cargo compartment 20. While the light bar 10 is generally shown as a continuous structure in FIGS. 1-3, it should be appreciated that the light bar 10 can be segmented if desired and can be constructed in a variety of shapes and dimensions. It should also be appreciated that the light bar 10 can be installed in other vehicle fixtures not shown herein. Such vehicle fixtures can include driver side structures, passenger side structures, front passenger compartment structures, rear passenger compartment structures, a headliner, a center console, and any other equipment or structure offering desirable installation opportunities. Further, while the light bar 10 has been shown variously installed in an automotive wheeled vehicle, it should be appreciated that the use of the light bar 10 can be extended to any passenger vehicle such as, but not limited to, trains, watercraft, and aircraft.

Figure 4:
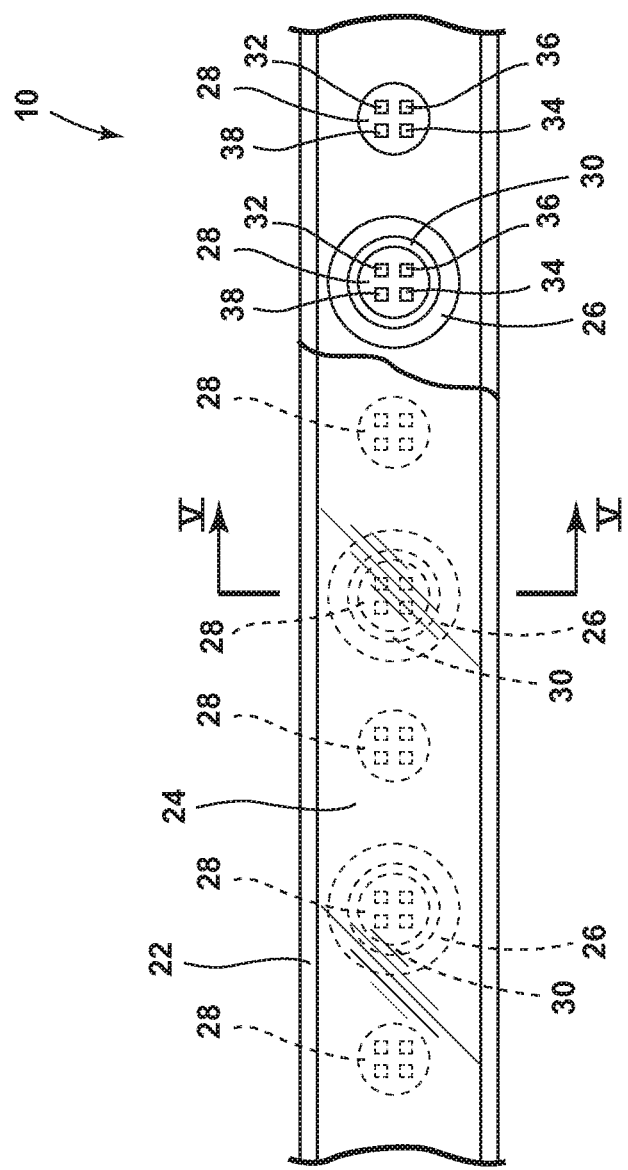
FIG. 4 shows a segment of a light bar according to one embodiment.

Referring to FIG. 4 the light bar 10 is shown according to one embodiment. The light bar 10 includes a carrier 22 having a surface 24 that typically occupies a large visible portion of the light bar 10 when installed in a vehicle fixture. The carrier 22 can be elongate, having a relatively small width, and can be constructed from any durable material, rigid or flexible. The surface 24 can span the length of the carrier 22 and can be constructed from a durable light transmissive material such as glass, plastic, and the like. The light bar 10 also includes capacitive sensors 26 and light sources 28, both of which are disposed below the surface 24 and can be spaced longitudinally along the carrier 22. The capacitive sensors 26 can be variously shaped, and are exemplarily shown having a round configuration to compliment a finger pad or a stylus tip, two popular conductors that are generally round in shape. However, it should be appreciated that other sensor shapes can also be used, such as square, rectangular, etc.

With respect to the illustrated embodiment, the light sources 28 are configured to illuminate the surface 24 and are each associated with at least one of the capacitive sensors 26. As shown, some of the light sources 28 can be disposed to alternate with the capacitive sensors 26. Additionally or alternatively, some of the light sources 28 can be disposed in an optional opening 30 extending through a corresponding capacitive sensor 26. As a result, each of those light sources 28 is able to illuminate an area of the surface 24 located directly above the surrounding capacitive sensor 26.

Each light source 28 can include one or more light emitting diodes (LED) of any desired color. As best illustrated in the cut away section of the light bar 10 shown in FIG. 4, each light source 28 can include a red LED 32, a green LED 34, and/or a blue LED 36 according to one embodiment. If employing all three LEDs 32, 34, 36, a variety of visible colors, including white light, can be expressed from the light source 28 by varying the power supplied to one or more of the LEDs 32, 34, 36. Additionally or alternatively, the light source 28 can include a white LED 38 that is dedicated to expressing white light. As is known, there are a number of ways in which to generate white light with LEDs. As such the white LED 38 can include single and multi-LED arrangements as well as phosphor coated LEDs. By providing one or more color options, a driving experience can be enhanced. Furthermore, by adjusting the power supplied to any given LED 32, 34, 36, 38 described herein, the brightness level of the light source 28 can be controlled. This enables the light bar 10, or portions thereof, to seamlessly transition between ambient and task lighting, either at the request of a user or via an autonomous process.

Figure 5:
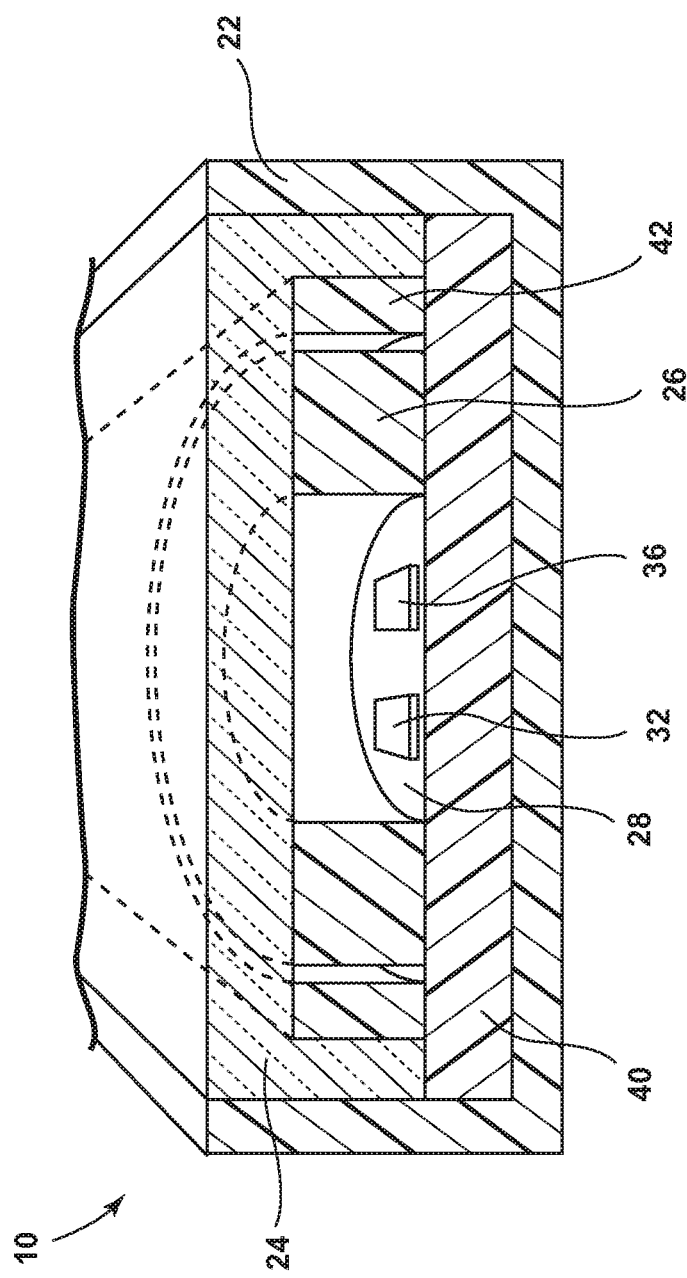
FIG. 5 shows a cross sectional view of the light bar taken along lines V-V of FIG. 4.

Referring now to FIG. 5, each capacitive sensor 26 and light source 28 can be mounted to a printed circuit board (PCB) 40 supported inside the carrier 22, which can be frictionally engaged with the surface 24. A ground element 42 can surround each capacitive sensor 26 to aid in minimizing the effects of electromagnetic interference (EMI) and can be continuous or segmented. By virtue of being in proximity to the capacitive sensors 26, some parasitic capacitance may be formed between the ground element 42 and corresponding capacitive sensors 26. When a finger, or other conductor, is within a sensing area of a capacitive sensor 26 (e.g. touches an area of the surface 24 above the capacitive sensor 26), the capacitive sensor 26 undergoes a capacitive change. Generally, the capacitance of the conductor is added to that of the capacitive sensor 26, which typically corresponds to the parasitic capacitance. Therefore, by measuring capacitive changes in the capacitive sensors 26, it is possible to determine when and where a conductor is applied to the light bar 10. However, one potential design concern is that the capacitance change caused by a finger can be relatively small compared to the parasitic capacitance. In these instances, the capacitive change may be so minute that it may be difficult to determine whether a conductor is applied to the light bar 10, which can result in false detections being reported. Thus, from a design perspective, it may be desirable to reduce the parasitic capacitance between a ground element 42 and an associated capacitive sensor 26 to ensure that the capacitive sensor 26 experiences a greater capacitive change when a conductor enters the sensing area. Some ways of reducing the parasitic capacitance can include, but are not limited to, selecting a surface 24 with a greater dielectric constant, decreasing the thickness of the surface 24, using relatively short and narrow circuit traces in the PCB 40, and increasing the diameter of the capacitive sensors 26. Implementing some or all of the abovementioned techniques, in addition to other techniques known to those possessing ordinary skill in the art, may enable a greater capacitive change to be measured in a capacitive sensor 26 in response to a conductor being present in the sensing area. As a result, the signal-to-noise ration (SNR) can be increased, thereby allowing for more accurate detection of a conductor.

Figure 6:
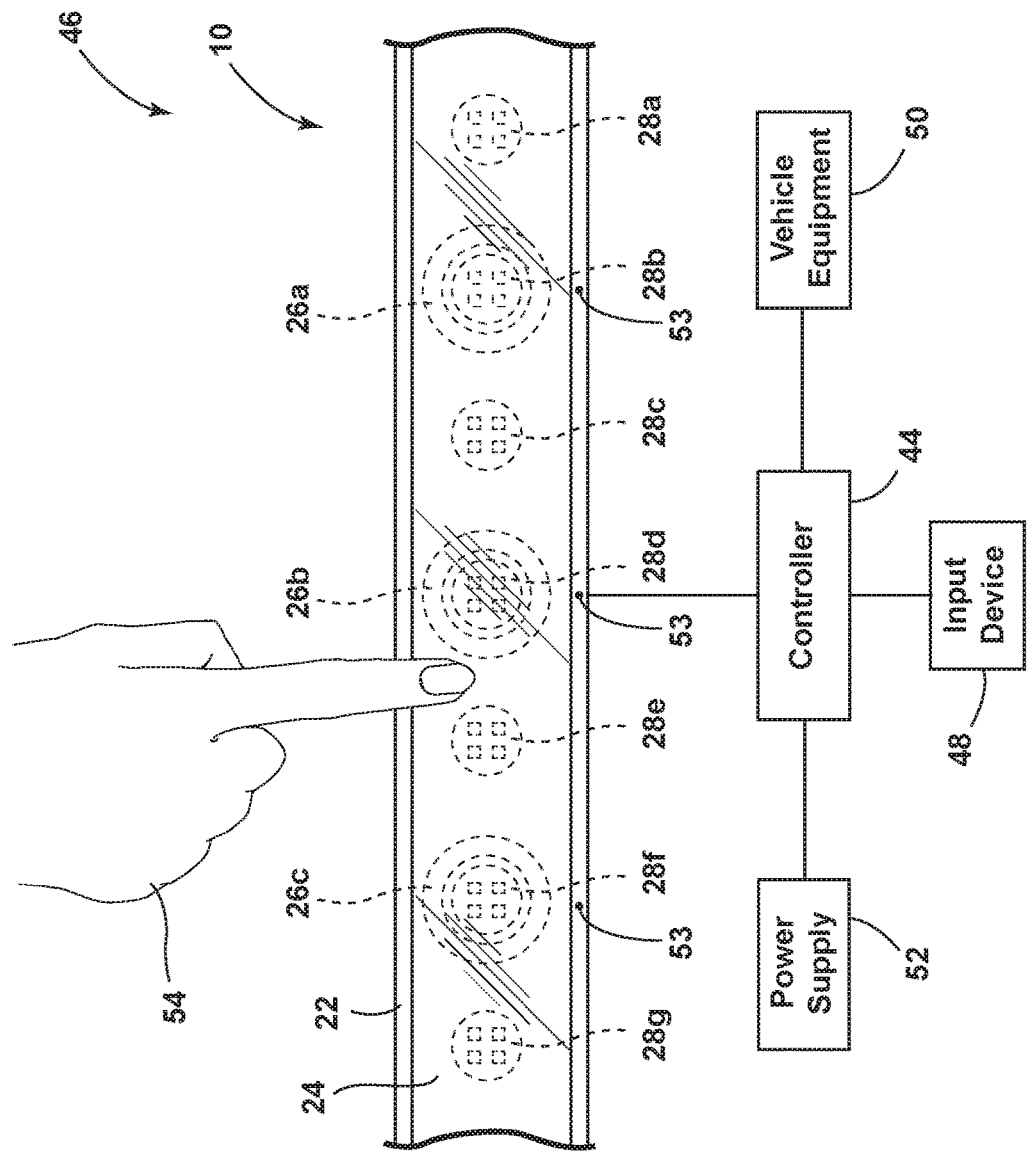
FIG. 6 shows a vehicle lighting system employing a light bar according to one embodiment.

To measure capacitive change, the light bar 10 can include at least one controller 44 as shown in FIG. 6. The controller 44 can be provided on the PCB 40 or external to the light bar 10 and is shown separate from the light bar 10 for purposes of illustration. As shown, the light bar 10 can be part of a vehicle lighting system 46 and the controller 44 can receive input from an input device 48, one or more vehicle equipment 50, and an electrical power supply 52. The input device 48 can be located next to the light bar 10 or located remotely. According to one embodiment, the input device 48 can be a human machine interface (HMI) such as a display monitor (e.g., monitor 17) located in the vehicle dashboard or other location and include buttons and/or a touchscreen that enable a user to enter input. In any event, input from the input device 48 is supplied to the controller 44 and can prompt the controller to power ON the light bar 10, power OFF the light bar 10, activate the light sources 28a-28g, and deactivate the light sources 28a-28g. Additionally, input from the input device 48 can also prompt the controller 44 to change the brightness of the light sources 28a-28g and/or change the color of the light expressed from the light sources 28a-28g.

It is also contemplated that the controller 44 can receive input from one or more vehicle equipment 50 to elicit an autonomous response of the light bar 10. For instance, vehicle equipment 50 can include an ambient light sensor that indicates whether dark conditions are present, in which case the controller 44 can be prompted to automatically activate the light sources 28a-28g to illuminate at a low brightness setting to provide ambient lighting. The controller 44 can vary the amount of power supplied to the light sources 28a-28g using pulse width modulation (PWM) or other suitable techniques to adjust their brightness levels. Power to the light bar 10 can be supplied via electrical power supply 52, which can be an on board vehicle power supply or an independent power source.

When the light bar 10 is powered ON, the controller 44 monitors the capacitive sensors 26a-26d and when a capacitive change is detected in a capacitive sensor 26a-26d, the controller 44 can alter an illumination state of at least one light source 28a-28g associated therewith, which is typically in close proximity to the corresponding capacitive sensor 26a-26d. As shown, multiple indicia 53 can be provided on the carrier 22 to inform a user of the relative position of capacitive sensors 26a-26d. This provides the user with the optimal areas along the surface 24 for sensing a conductor, exemplarily shown as finger 54 in FIG. 6. Additionally or alternatively, narrow spacing between the capacitive sensors 26a-26d can also increase the chances of a capacitive sensor 26a-26d being able to sense the presence of the finger 54 or other conductor. For purposes of illustration, the finger 54 is shown touching the surface 24 above capacitive sensor 26b, causing it to exhibit a capacitive change, as described previously. When the controller 44 detects a capacitive change in capacitive sensor 26b, the controller 44 can prompt various responses from an associated light source 28d depending on the illumination state thereof.

For instance, if the associated light source 28d is in a deactivated state, when a capacitive change is detected in capacitive sensor 26b, the controller 44 can subsequently activate the associated light source 28d and prompt it to emit light at a default brightness or a specified brightness in addition to a default color or a specified color, all of which can be selected via input device 48 and stored to controller memory for repeated use. According to one embodiment, when the associated light source 28d transitions from a deactivated state to an activated state, light can be emitted therefrom at a low brightness level to prevent against overwhelming the user and/or other vehicle occupants in instances where their eyes are adjusted to dark conditions, and as a result, are more sensitive to light.

Alternatively, if the associated light source 28d is already active when a user touches the surface 24 above capacitive sensor 26b, the controller 44 can increase or decrease the amount of power supplied to the associated light source 28d and/or change the color of light expressed from the associated light source 28d. For example, if the associated light source 28d is on a low brightness setting, subsequently touching the surface 24 above capacitive sensor 26b can prompt the controller 44 to increase the power supplied to the associated light source 28d, thereby causing an increase in brightness level. Conversely, if the associated light source 28d is on a high brightness setting, subsequently touching the surface 24 above capacitive sensor 26b can prompt the controller 44 to decrease the power supplied to the associated light source 28d, thereby causing a decrease in brightness level.

It should be appreciated that the light bar 10 can be configured to have multiple brightness settings such that progression from a lowest brightness setting to a maximum brightness setting requires a user to repeatedly touch the surface 24 above capacitive sensor 26b to prompt the controller 44 to incrementally increase the amount of power supplied to the associated light source 28d until the maximum brightness setting is reached. Once reached, each subsequent touching of the surface 24 above capacitive sensor 26b prompts the controller 44 to incrementally decrease the amount of power supplied to the associated light source 28d until it becomes deactivated. Additionally or alternatively, with each detected touch, the controller 44 can prompt the associated light source 28d to emit a different colored light. For example, the lowest brightness setting can be characterized by low intensity blue light to provide ambient lighting while the maximum brightness level can be characterized by high intensity white light to provide task lighting.

While a single associated light source 28d has been described above in relation to capacitive sensor 26b, it should be appreciated that other light sources, such as light sources 28c and 28e can also be associated with capacitive sensor 26b and controlled by the controller 44 in the above-described manner. In such a configuration, when finger 54 touches the surface 24 above capacitive sensor 26b, the controller 44 can alter the illumination state of all three associated light sources 28c-28e in unison, which causes a larger area of the surface 24 to be visually impacted as compared to the impact area observed from using associated light source 28d alone. It is contemplated that the user may be given options as to the desired size of the impact area, which the user can select via the input device 48.

Accordingly, a light bar 10 for use in a vehicle lighting system 46 has been advantageously provided herein. The light bar 10 includes a surface 24 that can be made to illuminate using an input device 48, which allows a user to specify a desired brightness and/or color. Additionally, a user can change the illumination state of a desired area of the surface 24 via capacitive touch. By simply touching the desired area with a conductor, the user may cause the desired area to be illuminated, increase or decrease the brightness level associated with the desired area, change the color of the light expressed from the desired area, cease illumination of the desired area, or certain combinations thereof. As a result, the user's driving experience can be enhanced.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A light bar of a vehicle, comprising:
an elongated carrier integrated in an outer surface of a vehicle fixture and having a surface extending a length of the carrier, the vehicle fixture located inside the vehicle and the outer surface being directly exposed within an occupant compartment of the vehicle;
capacitive sensors spaced along the carrier and positioned below the surface;
light sources for illuminating the surface, each associated with at least one capacitive sensor and positioned proximate thereto, wherein every other light source is enclosed by one of the capacitive sensors and the remaining lights sources are free from being enclosed by capacitive sensors; and
a controller for detecting capacitive changes in the capacitive sensors, wherein when the controller detects a capacitive change in a capacitive sensor, the controller alters an illumination state of the light source enclosed by the capacitive sensor and at least one other light source adjacent thereto;
wherein when a light source is in an activated state, each subsequent capacitive change in the associated capacitive sensor results in an incremental increase in brightness of the light source until a maximum brightness is reached; and
wherein when the maximum brightness is reached, each subsequent capacitive change in the associated capacitive sensor results in an incremental decrease in brightness of the light source until the light source becomes deactivated, and
wherein when the light source is activated at a lowest brightness setting, the light source illuminates in a first color, and wherein when the light source is activated at a maximum brightness setting, the light source illuminates in a second color that is perceptively different than the first color.

2. The light bar of claim 1, wherein the capacitive sensors have a round configuration and an opening extending therethrough for enclosing the corresponding light source.

3. The light bar of claim 1, wherein each light source comprises at least one of a red light emitting diode, a green light emitting diode, a blue light emitting diode, and a white light emitting diode.

4. The light bar of claim 1, wherein the controller alters the illumination state of the light source by at least one of activating the light source, deactivating the light source, changing a color expressed by the light source, and adjusting a brightness of the light source.

5. The light bar of claim 1, installed in a vehicle fixture and configured for use in a vehicle lighting system, wherein the controller is supplied input from at least one of an input device and a vehicle equipment.

6. A light bar of a vehicle, comprising:
a carrier having a surface and integrated with an outer surface of a vehicle fixture located inside the vehicle, the outer surface being directly exposed within an occupant compartment of the vehicle;

capacitive sensors spaced along the carrier;

light sources for illuminating the surface, wherein every other light source is enclosed by a capacitive sensor and the remaining light sources are free from being enclosed by capacitive sensors; and a controller for detecting capacitive changes in the capacitive sensors, wherein when the controller detects a capacitive change in a capacitive sensor, the controller alters an illumination state of at least a light source enclosed by the capacitive sensor;

wherein when the light source is activated at a lowest brightness setting, the light source illuminates in a first color; and wherein when the light source is activated at a maximum brightness setting, the light source illuminates in a second color that is perceptively different than the first color, and wherein when the light source is in an activated state, each subsequent capacitive change in the associated capacitive sensor results in an incremental increase in brightness of the light source until a maximum brightness is reached; and wherein when the maximum brightness is reached, each subsequent capacitive change in the associated capacitive sensor results in an incremental decrease in brightness of the light source until the light source becomes deactivated.

7. The light bar of claim 6, wherein the capacitive sensors have a round configuration and an opening extending therethrough for enclosing the corresponding light source.

8. The light bar of claim 6, wherein each light source comprises at least one of a red light emitting diode, a green light emitting diode, a blue light emitting diode, and a white light emitting diode.

9. The light bar of claim 6, further comprising indicia disposed to indicate a relative location of at least one of the capacitive sensors.

10. The light bar of claim 6, wherein the controller alters the illumination state of the light source by at least one of activating the light source, deactivating the light source, changing a color expressed by the light source, and adjusting a brightness of the light source.

11. The light bar of claim 6, configured for use in a vehicle lighting system, wherein the controller is supplied input from at least one of an input device and a vehicle equipment.

12. A vehicle light bar comprising:

capacitive sensors;

light sources spaced along a carrier integrated with an outer surface of an interior vehicle fixture, the outer surface being directly exposed within an occupant compartment of the vehicle, and every other light source enclosed by one of the capacitive sensors and the remaining lights sources free from being enclosed by capacitive sensors; and a controller for detecting capacitive changes in a capacitive sensor and altering an illumination state of at least the light source enclosed by the capacitive sensor when a capacitive change is detected, and wherein when the light source is activated at a lowest brightness setting, the at least one light source illuminates in a first color, and wherein when the at least one light source is activated at a maximum brightness setting, the at least one light source illuminates in a second color that is perceptively different than the first color.

13. The light bar of claim 12, wherein each light source is associated with at least one capacitive sensor such that when the at least one capacitive sensor undergoes a capacitive change, the controller alters the illumination state of any light sources associated with the at least one capacitive sensor.

14. The light bar of claim 12, wherein the capacitive sensors have a round configuration and an opening extending therethrough for enclosing the corresponding light source.

15. The light bar of claim 12, wherein each light source comprises at least one of a red light emitting diode, a green light emitting diode, a blue light emitting diode, and a white light emitting diode.

16. The light bar of claim 12, further comprising indicia disposed to indicate a relative location of at least one of the capacitive sensors.

17. The light bar of claim 12, wherein the controller alters the illumination state of the light source by at least one of activating the light source, deactivating the light source, changing a color expressed by the light source, and adjusting a brightness of the light source.

* * * * *